(12) United States Patent
Holloway et al.

(10) Patent No.: US 8,117,618 B2
(45) Date of Patent: Feb. 14, 2012

(54) FORWARD PROGRESS MECHANISM FOR A MULTITHREADED PROCESSOR

(75) Inventors: David C. Holloway, Cedar Park, TX (US); Trinh H. Nguyen, Round Rock, TX (US); Michael D. Snyder, Cedar Park, TX (US); Gary L. Whisenhunt, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1159 days.

(21) Appl. No.: 11/871,626

(22) Filed: Oct. 12, 2007

(65) Prior Publication Data

US 2009/0100432 A1 Apr. 16, 2009

(51) Int. Cl.
*G06F 9/46* (2006.01)
(52) U.S. Cl. ........................................ 718/103; 718/102
(58) Field of Classification Search ........................ None
See application file for complete search history.

(56) References Cited

U.S. PATENT DOCUMENTS

| | | | |
|---|---|---|---|
| 6,105,051 A | 8/2000 | Borkenhagen et al. | |
| 6,928,647 B2 | 8/2005 | Sager | |
| 7,401,207 B2* | 7/2008 | Kalla et al. | 712/215 |
| 7,748,001 B2* | 6/2010 | Burns et al. | 718/100 |
| 2001/0039559 A1* | 11/2001 | Eilert et al. | 709/104 |
| 2002/0138679 A1 | 9/2002 | Koning et al. | |
| 2003/0158885 A1* | 8/2003 | Sager | 709/108 |
| 2004/0215933 A1 | 10/2004 | Nguyen et al. | |
| 2006/0037025 A1* | 2/2006 | Janssen et al. | 718/107 |

FOREIGN PATENT DOCUMENTS

WO 99/21083 4/1999

OTHER PUBLICATIONS

Borkenhagen et al., "A Multithreaded PowerPC Processor for Commercial Servers," IBM J. Res. Develop., vol. 44, No. 6, Nov. 2000, pp. 885-898.

* cited by examiner

*Primary Examiner* — Emerson Puente
*Assistant Examiner* — Dong Kim

(57) ABSTRACT

A processing device includes a storage component configured to store instructions associated with a corresponding thread of a plurality of threads, and an execution unit configured to fetch and execute instructions. The processing device further includes a period timer comprising an output to provide an indicator in response to a count value of the period timer reaching a predetermined value based on a clock signal. The processing device additionally includes a plurality of thread forward-progress counter components, each configured to adjust a corresponding execution counter value based on an occurrence of a forward-progress indicator while instructions of a corresponding thread are being executed. The processing device further includes a thread select module configured to select threads of the plurality of threads for execution by the execution unit based a state of the period timer and a state of each of the plurality of thread forward-progress counter components.

20 Claims, 3 Drawing Sheets

FORWARD PROGRESS MECHANISM FOR A MULTITHREADED PROCESSOR

FIELD OF THE DISCLOSURE

The present disclosure relates generally to processing devices and more particularly to multithreading in processing devices.

BACKGROUND

Although utilizing multiple threads at a processing device can generally improve processing efficiency, multithreading implementations often are at risk of failing to ensure forward progress for all threads available for execution. Techniques have been developed in an attempt to ensure that one thread, or a small subset of threads, does not continuously occupy a processing device. One conventional technique for forward progress is to utilize an instruction counter to ensure that each thread, upon selection, executes for at least a minimum number of instructions before it can be switched out for another thread. However, livelock situations between multiple threads can result because this technique, while ensuring that a minimum number of instructions of a thread are executed before the thread can be switched out, does not ensure that it is not the same instructions being executed again and again. Accordingly, an improved technique for facilitating forward progress in a multithreaded processing system would be advantageous.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
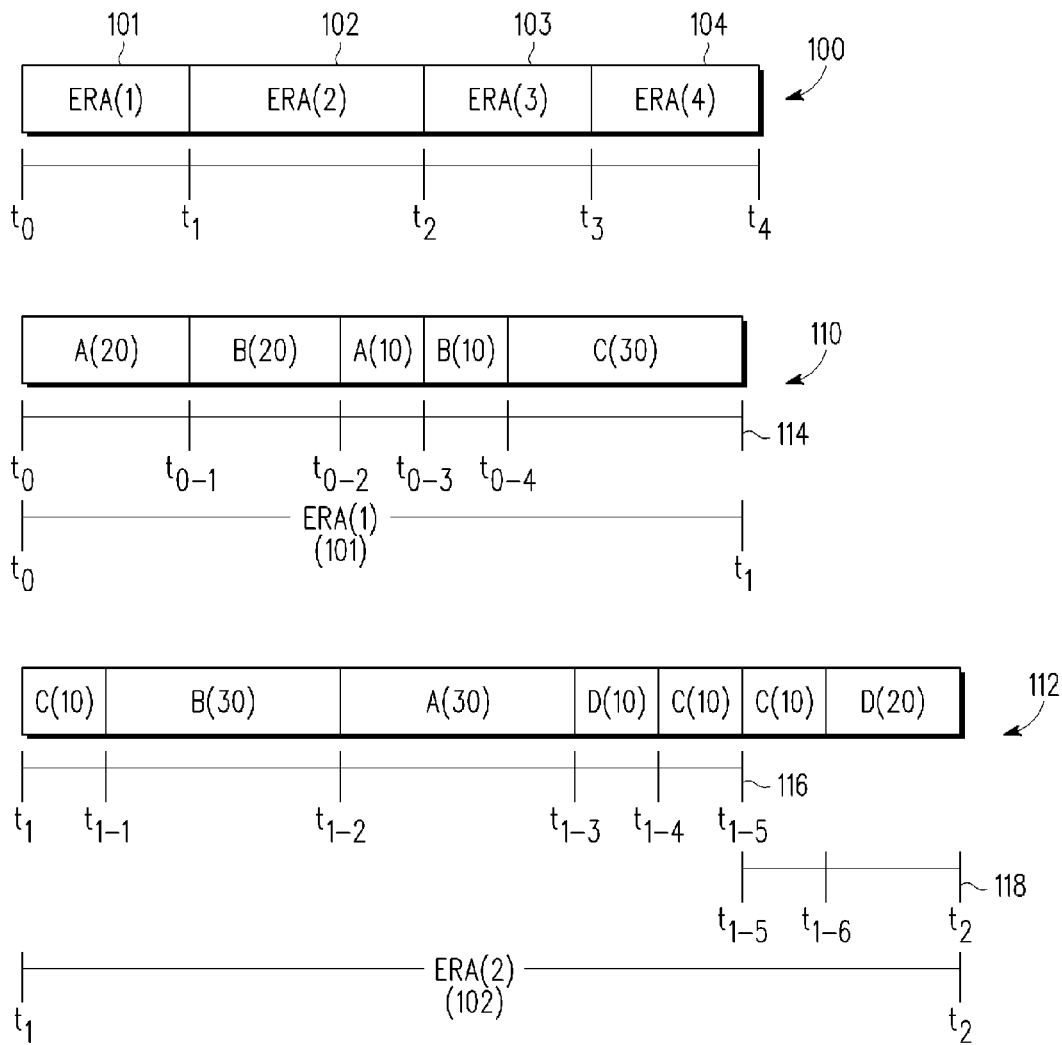
FIG. 1 is a timing diagram illustrating an example sequence of execution eras for a processing device in accordance with at least one embodiment of the present disclosure.

In accordance with at least one aspect of the present disclosure, a method includes selectively executing, during a first period having a predetermined duration, one or more threads from a plurality of threads at a processing device based on a first thread priority configuration. In response to determining that each thread of a subset of threads of the plurality of threads has not met a forward-progress metric during the first period, the first thread priority configuration is modified by increasing a priority of each thread of the subset of threads to generate a second thread priority configuration and each thread of the subset of threads is selectively executed based on the second thread priority configuration until each thread of the subset of threads has met the forward-progress metric collectively over the first period and the second period.

In accordance with another aspect of the present disclosure, a method includes initializing a first timer at a processing device. The method further includes selectively executing one or more threads of a plurality of threads at the processing device based on normal priorities associated with the plurality of threads until the first timer expires, wherein an execution counter value associated with a corresponding thread is adjusted proportional to an occurrence of a forward-progress indicator during execution of the thread. The method additionally includes, in response to determining each execution counter value associated with the plurality of threads is at a predetermined value when the first timer expires, reinitializing the first timer and selectively executing one or more threads of the plurality of threads based on the normal priorities until the first timer expires. The method further includes, in response to determining each execution counter value associated with a subset of the plurality of threads is not at the predetermined value when the first timer expires disabling execution of each thread of the plurality of threads not included in the subset of the plurality of threads and selectively executing each thread of the subset of the plurality of threads until each execution counter value associated with a corresponding thread of the subset of the plurality of threads is at the predetermined value. The execution counter value associated with the corresponding thread is adjusted proportional to an occurrence of a forward-progress indicator during execution of the corresponding thread.

In accordance with yet another aspect of the present disclosure, a processing device includes a storage component configured to store instructions, each instruction associated with a corresponding thread of a plurality of threads, and an execution unit configured to fetch instructions from the storage component and execute the fetched instructions. The processing device further includes a period timer comprising an input to receive a clock signal and an output to provide an indicator in response to a count value of the period timer reaching a predetermined value based on the clock signal. The processing device additionally includes a plurality of thread forward-progress counter components. Each thread forward-progress counter component associated with a corresponding thread of the plurality of threads and is configured to adjust a corresponding execution counter value based on an occurrence of a forward-progress indicator while instructions of the corresponding thread are being executed by the execution unit. The processing device further includes a thread select module configured to select threads of the plurality of threads for execution by the execution unit based a state of the period timer and a state of each of the plurality of thread forward-progress counter components.

Figure 2:
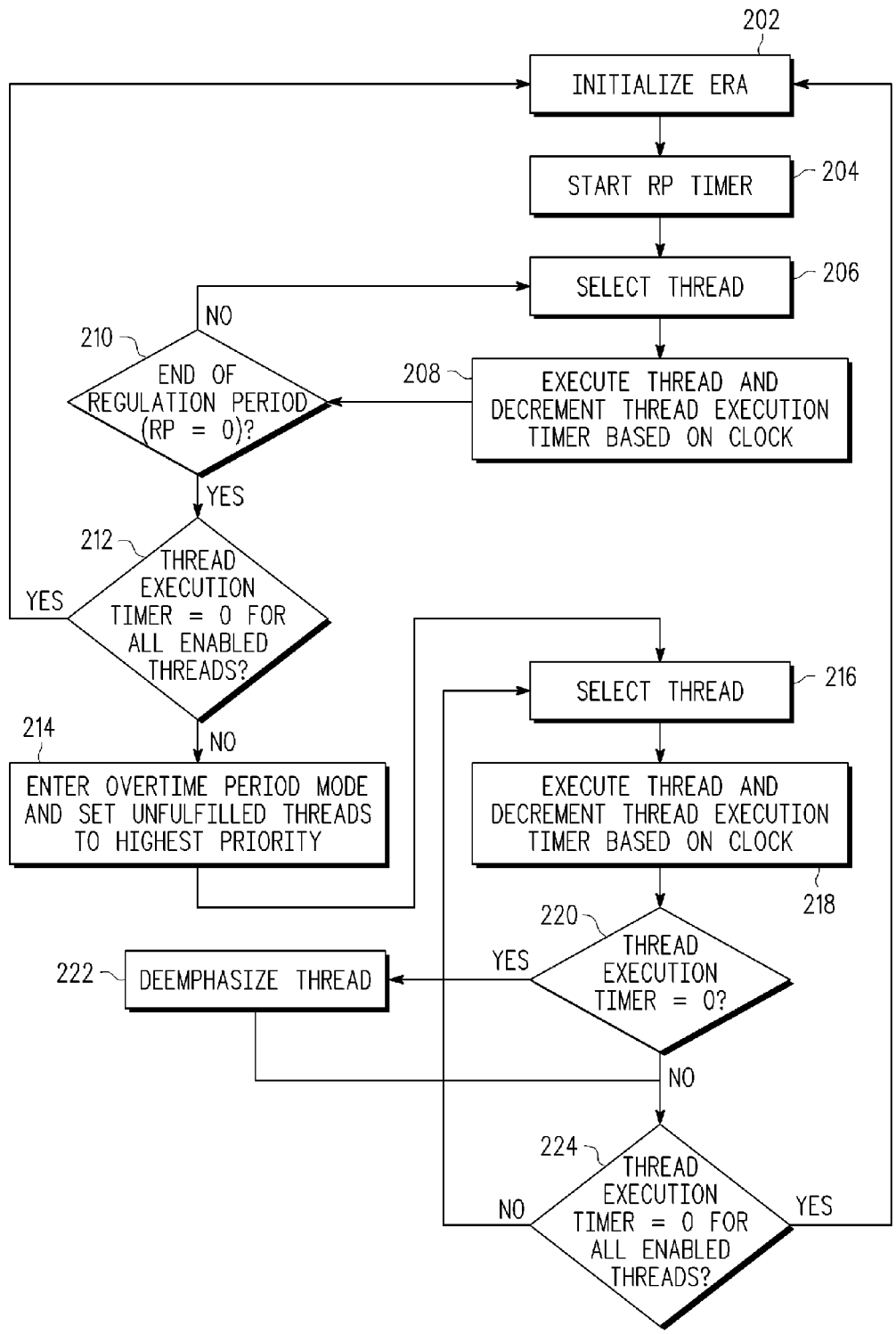
FIG. 2 is a flow diagram illustrating an era-based thread scheduling method in accordance with at least one embodiment of the present disclosure.
Figure 3:
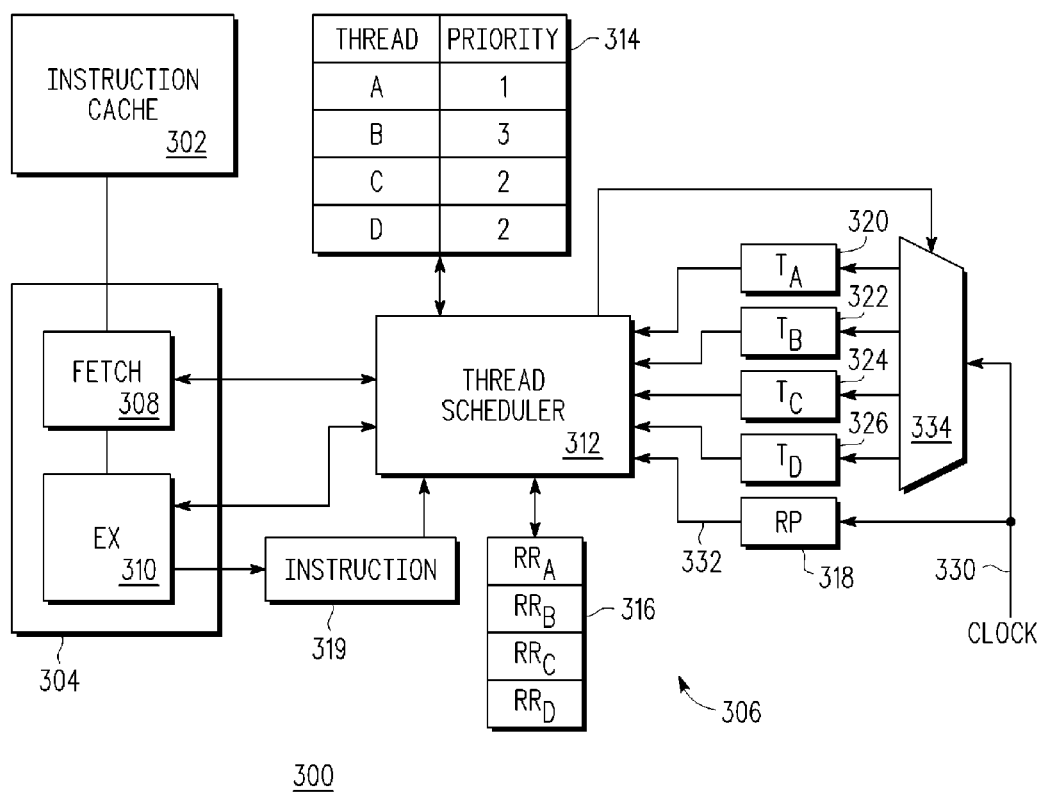
FIG. 3 is a block diagram illustrating a processing device utilizing era-based thread scheduling in accordance with at least one embodiment of the present disclosure.

FIGS. 1-3 illustrate example techniques for scheduling thread execution in a processing device. In one embodiment, the operation of a processing device can be organized as a series of execution eras. Each era includes at least first predetermined duration, referred to herein as a "regulation period," during which threads can be selected and executed in accordance with the normal thread selection criteria (e.g., via a normal thread priority configuration). In the event that a specified forward-progress metric is met as a result of the execution of the threads during the regulation period of an era, the next era begins with its own regulation period. Otherwise, if a forward-progress metric is not met, the era further can include a second duration, referred to herein as an "overtime period," during which threads are selected and executed based on modified thread selection criteria (e.g., a modified thread priority configuration) until the forward-progress metric is met for each thread eligible for execution collectively over the regulation period and the overtime period, at which time the next era begins. Further, in one embodiment, an instruction counter can be used to ensure that a thread is not switched out until it has executed a minimum number of instructions.

Any of a variety of forward-progress indicators can be used to determine whether a forward-progress metric has been met for a thread during an era. In at least one embodiment, the forward-progress indicator for a thread is based on usage or allocation of a resource of a processing device to the thread during the execution of the thread. Examples of forward-progress indicators during execution of a thread include, but are not limited to, cycles of a clock signal during execution of the thread, instructions executed during execution of the thread, memory transactions (e.g., cache hits or misses) during execution of the thread, fetches (data or instructions) during execution of the thread, branches (branch resolutions or mispredictions) during execution of the thread, and uses of other processor resources, such as uses of an execution unit, a dispatch buffer, or a completion buffer. Accordingly, a forward-progress metric for execution of a thread during an era can include, but are not limited to, a cumulative number of cycles of a clock signal during execution of the thread during the era, a cumulative number of instructions of the thread executed during the era, a cumulative number of memory transactions during execution of the thread during the era, a cumulative number of fetches during execution of the thread during the era, a cumulative number of branches during execution of the thread during the era, and the like. For ease of illustration, the example techniques of the present disclosure are described in the example context of execution time (clock cycles) as the forward-progress metric. Another forward-progress metric, such as a combination of one or more of those identified above, can be utilized based on the guidelines provided herein without departing from the scope of the present disclosure.

FIG. 1 illustrates an execution timeline 100 of a processing device utilizing an era-based thread selection technique in accordance with at least one embodiment of the present disclosure. In the depicted example, the execution timeline 100 includes a series of four eras: eras 101, 102, 103, and 104 (also identified in FIG. 1 as era(1), era(2), era(3), and era(4), respectively). Although four eras are illustrated for ease of discussion, it will be appreciated that a larger number of eras typically would occur during the operation of the processing device. Era 101 initiates at time $t_0$ and terminates at time $t_1$, era 102 initiates at time $t_1$ and terminates at time $t_2$, era 103 initiates at time $t_2$ and terminates at time $t_3$, and era 104 initiates at time $t_3$ and terminates at time $t_4$. Timelines 110 and 112 illustrates era 101 and era 102, respectively, in greater detail.

Each of the eras 101-104 include a period of predetermined length, or "regulation period," during which threads are selected and executed in accordance with normal, or default, thread selection criteria, such as relative thread priorities set by the threads themselves, an operating system, and the like. To illustrate, era 101 includes a regulation period 114 and era 102 includes a regulation period 116. Further, in the event that a forward-progress metric is not met for the era at the end of the regulation period of the era, the era further can include an additional period, or "overtime period," during which the thread selection criteria are modified and thread selection and execution continues for the overtime period based on the modified thread selection criteria until the forward-progress metric is met collectively over the regulation period and the overtime period, at which point a new era can begin. As discussed in detail below, in the example of FIG. 1 the forward progress metric is met at the end of the regulation period 114 of era 101 and thus era 101 does not include an overtime period, whereas the forward progress metric is not met at the end of the regulation period 116 of era 102 and thus era 102 includes an overtime period 118. Eras 103 and 104 likewise each can include or omit an overtime period depending on whether forward-progress metrics are met during their respective regulation periods.

In one embodiment, the regulation period of an era is a fixed duration set via a timer or other timing mechanism. The duration of the regulation period of each era can be constant throughout the operation of the processing device, or it can be adjusted at one or more points during the operation of the processing device so as to more finely tune the thread selection technique to the particular operating characteristics of the processing device. For example, the processing device may note after a sequence of eras that an overtime period is required for a large proportion of the eras. In this instance, the processing device may lengthen the regulation period for subsequent eras in an attempt to permit more time for the forward-progress metric to be met during the regulation periods of the eras. Further, the regulation period can be the same for two or more eras regardless of the characteristics of the threads available for execution during the eras, or the regulation period can be adjusted to take into account the characteristics of the threads available for execution. To illustrate, a regulation period for an era during which four threads are available can be made longer than the regulation period for an era during which only two threads are available for execution.

The overtime period likewise can be a fixed duration for each era having one, and may be fixed or dynamically adjustable. However, this can lead to inefficiencies due to the modified thread selection criteria. Accordingly, in another embodiment, the overtime period of an era can be terminated once the one or more forward-progress metric have been met for the era, subject to a maximum allowable duration for the overtime period.

In one embodiment, the forward-progress indicator comprises execution time for a thread and thus the forward-progress metric for an era includes verification that each thread available for execution achieves a minimum cumulative execution time during the era, where the minimum cumulative execution time for a thread can be measured based on the number of clock cycles of a clock allocated to execution of the thread during the regulation period, the number of instructions executed by the thread during the regulation period, and the like. In another embodiment, forward-progress metric can include other metrics besides clock cycles or a number of instructions, such as a minimum number of memory transactions, fetches, branches, or combinations thereof, that occur during the execution of the thread during the regulation period.

The thread selection criteria can include, for example, a thread priority configuration indicating relative thread priorities among the available threads and thus the modification of the thread selection criteria can include the modification of the relative priority of one or more of the available threads when it is deemed that a forward-progress criterion has not been met at the end of a regulation period of an era. In the instance of a forward-progress metric including a minimum cumulative execution time for each available thread, those available threads not achieving the minimum cumulative execution time can have their thread priority increased relative to those threads that achieved the minimum cumulative execution time during the regulation period. As discussed in greater detail herein with reference to FIG. 3, a highest priority settable via hardware only (i.e., not settable by via software, an operating system, or a hypervisor) can be assigned to those threads that have not achieved the minimum cumulative execution time, thereby effectively making them the only threads available for selection and execution during an overtime period.

An example era-based thread selection and execution process for eras 101 and 102 are described in the following using the timelines 110 and 112 and Table 1 below. For this example, the regulation period is defined as 90 cycles (e.g., 90 pipeline clock cycles) and implemented as a resetable timer RP that is initialized with the value of 90 and which counts down to zero before resetting, and there are four threads (threads A, B, C, and D) available for execution during one or both of the eras 101 and 102. The cumulative execution times of threads A-D are represented by variables $T_A$, $T_B$, $T_C$, and $T_D$, respectively. For purposes of this example, the forward-progress metric is that each available thread reaches 30 cycles of cumulative execution time during an era, and thus the variables $T_A$, $T_B$, $T_C$, and $T_D$ each are set to a value of 30 at the start of an era and are decremented proportional to the time the corresponding thread is executed during the era. Although the example of FIG. 1 is illustrated in the context of execution time as the forward-progress indicator for determining whether a forward-progress metric is met during each era, other forward-progress indicators can be used determine whether a corresponding forward-progress metric is met as appropriate.

The availability of a thread for execution at a given point in time (ready-to-run) is represented by variables $RR_A$, $RR_B$, $RR_C$, and $RR_D$, respectively, with the values of 0 and 1 indicating the corresponding thread is unavailable and available, respectively. The thread priority configuration of threads A-D is represented by variables $Priority_A$, $Priority_B$, $Priority_C$, and $Priority_D$, respectively, with a thread priority of 0 being the highest priority (e.g., a hardware-only priority) and a thread priority of 3 being the lowest priority. Further, in the following example, an instruction counter also is utilized to ensure that the selected thread is executed for at least 10 cycles before it can be replaced with another thread.

At time $t_0$, the regulation period 114 of era 101 initiates. For era 101, it is assumed that thread D is unavailable for any of a variety of reasons. For example, thread D may have initiated a memory transaction to obtain data and thus may be disabled while waiting for the memory transaction to complete. Based on the thread priority configuration of available threads A, B, and C at time $t_0$, thread A is initially selected for execution for 20 cycles until time $t_{0-1}$. Accordingly, by time $t_{0-1}$, thread A has accumulated 20 cycles of execution, and thus variable $T_A$ has decremented from 30 to 10. Thread B then is selected for execution for 20 cycles until time $t_{0-2}$, thus accumulating 20 cycles of execution as of time $t_{0-2}$, and variable $T_B$ is decremented proportionally. Thread A then is selected for execution between times $t_{0-2}$ and time $t_{0-3}$ for another 10 cycles of execution, which results in a cumulative execution time of 30 cycles, which meets the minimum cumulative execution time.

The processing device selects and executes thread B for 10 cycles from time $t_{0-3}$ to time $t_{0-4}$. At time $t_{0-4}$, thread B has achieved the minimum execution time of 30 cycles during era 101. Thread C then is selected and executed for 30 cycles between time $t_{0-4}$ and time $t_1$, at which point the regulation period 114 is scheduled to end (with variable RP reaching 0 at time $t_1$). At the end of regulation period 114, each of the available threads A, B, and C has executed for the minimum cumulative execution time and thus the forward-progress metric for era 101 has been met at the end of the regulation period 114. Accordingly, no overtime period is needed for era 101.

At the initiation of the era 102 at time $t_1$, the variable RP is reset to 90 and the variables $T_A$, $T_B$, and $T_C$ are reset to 30. Further, in this example, it is assumed that thread D has become available and thus its variable $T_D$ is set to 30 and its variable $RR_D$ is set to 1 also. Since thread C was the thread being executed at the end of the regulation period 114 of era 101, the thread C is permitted to remain in execution for 10 cycles from time $t_1$ to time $t_{1-1}$ of era 102 so as to avoid the overhead of a thread switch. At time $t_{1-1}$, thread B is selected for execution and executes for 30 cycles from time $t_{1-1}$ to time $t_{1-2}$. Thread B therefore has a cumulative execution time of 30 cycles at time $t_{1-2}$. At time $t_{1-2}$, thread A is selected for execution for 30 cycles from time $t_{1-2}$ to time $t_{1-3}$ and thus thread A achieves a cumulative execution time of 30 cycles by time $t_{1-3}$. At time $t_{1-3}$, thread D is selected for execution for 10 cycles from time $t_{1-3}$ to time $t_{1-4}$ and at time $t_{1-4}$, thread C is selected for execution for 10 cycles from time $t_{1-4}$ to time $t_{1-5}$, at which point the regulation period 116 of era 102 ends. In this example, the forward-progress metric for era 102 has not been met because neither thread C nor thread D has achieved the minimum cumulative execution time of 30 cycles for era 102 at the time of expiry of the regulation period 116. Accordingly, an overtime period 118 for era 102 is initiated at time $t_{1-5}$. As illustrated by Table 1, the initialization of the overtime period 118 includes changing the thread priorities of threads C and D to the highest priority 0, which in this example is a priority level accessible only via the thread selection hardware.

Based on the adjusted thread priorities, at time $t_{1-5}$ thread C is selected for execution and executes for 10 cycles, at which point the minimum cumulative execution time of 30 cycles for era 102 is met for thread C. Accordingly, the thread priority of thread C is returned to its previous priority. With only thread D having the highest priority, thread D is selected and executed for 20 cycles starting at time $t_{1-6}$, at the end of which the minimum cumulative execution time of 30 cycles for era 102 is met for thread D at time $t_2$. As every available thread has had the minimum cumulative execution time of 30 cycles

TABLE 1

| Variable | $t_0$ | $t_{0-1}$ | $t_{0-2}$ | $t_{0-3}$ | $t_{0-4}$ | t1 | $t_{1-1}$ | $t_{1-2}$ | $t_{1-3}$ | $t_{1-4}$ | $t_{1-5}$ | $t_{1-6}$ | $t_2$ |
|---|---|---|---|---|---|---|---|---|---|---|---|---|---|
| RP | 90 | 70 | 50 | 40 | 30 | 0/90 | 80 | 50 | 20 | 10 | 0 | 0 | 0/90 |
| $T_A$ | 30 | 10 | 10 | 0 | 0 | 0/30 | 30 | 30 | 0 | 0 | 0 | 0 | 0/30 |
| $T_B$ | 30 | 30 | 10 | 10 | 0 | 0/30 | 30 | 0 | 0 | 0 | 0 | 0 | 0/30 |
| $T_C$ | 30 | 30 | 30 | 30 | 30 | 0/30 | 20 | 20 | 20 | 20 | 10 | 0 | 0/30 |
| $T_D$ | 30 | 30 | 30 | 30 | 30 | 30 | 30 | 30 | 30 | 20 | 20 | 20 | 0/30 |
| $RR_A$ | 1 | 1 | 1 | 1 | 1 | 1 | 1 | 1 | 1 | 1 | 1 | 1 | 1 |
| $RR_B$ | 1 | 1 | 1 | 1 | 1 | 1 | 1 | 1 | 1 | 1 | 1 | 1 | 1 |
| $RR_C$ | 1 | 1 | 1 | 1 | 1 | 1 | 1 | 1 | 1 | 1 | 1 | 1 | 1 |
| $RR_D$ | 0 | 0 | 0 | 0 | 0 | 0/1 | 1 | 1 | 1 | 1 | 1 | 1 | 1 |
| $Priority_A$ | 1 | 1 | 1 | 1 | 1 | 1 | 1 | 1 | 1 | 1 | 1 | 1 | 1 |
| $Priority_B$ | 1 | 1 | 1 | 1 | 1 | 1 | 1 | 1 | 1 | 1 | 1 | 1 | 1 |
| $Priority_C$ | 2 | 2 | 2 | 2 | 2 | 2 | 2 | 2 | 2 | 2 | 0 | 2 | 2 |
| $Priority_D$ | 3 | 3 | 3 | 3 | 3 | 3 | 3 | 3 | 3 | 3 | 0 | 0 | 0/3 | for era 102 by time $t_2$ (i.e., the variables $T_A$, $T_B$, $T_C$, and $T_D$ each is zero), the forward-progress metric of era 102 is met at time $t_2$. The overtime period 118 therefore is terminated at time $t_2$ and the next era, era 103, is initiated.

FIG. 2 illustrates an example method 200 of era-based thread selection and execution in accordance with at least one embodiment of the present disclosure. As discussed above, the operation of a processing device can be arranged as a sequence of eras. At block 202, an era is initialized by, for example, resetting a regulation period (RP) timer used to measure the regulation period to a predetermined number representative of the duration of the regulation period. Further, thread priorities of threads can be returned to their normal priorities, the thread execution timers used to measure the cumulative execution time of the corresponding threads can be reset to a predetermined value, and the like. At block 204, the RP timer is started. In one embodiment, the RP timer is a decrement timer and thus the RP timer counts down until reaching a predetermined value (e.g., zero) at which point an interrupt or other indicator is asserted to identify the end of the regulation period of the era initialized at block 202.

At block 206, a thread is selected based on the normal thread selection criteria (e.g., relative thread priorities) and the selected thread is executed at block 208. While the selected thread is being executed, the thread execution timer can be concurrently decremented (or incremented if implemented as an increment timer) in proportion to its execution time so as to measure the cumulative execution time accorded to the selected timer. Further, in one embodiment, an instruction counter is utilized to ensure that at least a minimum number of instructions associated with the selected thread are executed at block 208 before the selected thread can be switched out with a different thread.

At block 210, the processing device determines whether the RP timer has expired (e.g., reached a predetermined value), thereby indicating that the regulation period of the era has ended. If the regulation period has not yet ended, the method 200 returns to block 206, whereby another available thread is selected (conditional upon a minimum number of instructions executed for the current thread) and executed in accordance with the processes represented by blocks 206, 208, and 210.

Otherwise, if the regulation period has ended, the processing device determines whether each of the available threads has met the forward-progress metric, i.e., cumulatively executed for the minimum cumulative execution time for the era by, for example, verifying whether the thread execution timer for each of the available threads has expired (e.g., reached zero for a decrement timer implementation). If all available threads have met the forward-progress metric, i.e., executed for the minimum cumulative execution time (e.g., all of thread execution timer of the available threads have reached the predetermined value), forward progress on every available thread has been considered to have been made and the method 200 returns to block 202 for the next era.

Otherwise, if one or more available threads have not met the forward-progress metric by being cumulatively executed for the minimum cumulative execution time (e.g., one or more of the thread execution timers are not at the predetermined value), the processing device enters an overtime period mode at block 214. At block 214, the unfulfilled threads (i.e., those available threads that have not executed for the minimum cumulative execution time during the regulation period) are set to a highest priority and the fulfilled threads (i.e., those available threads that have executed for the minimum cumulative execution time during the regulation period) are deemphasized or prevented from being selected. At block 216, an unfulfilled thread is selected and at block 218 the selected thread is executed while the corresponding thread execution timer is adjusted concurrent with the execution of the selected thread.

At block 220, the processing device determines whether the selected thread has met the forward-progress metric by reaching the minimum cumulative execution time (e.g., the corresponding thread execution timer has reached the predetermined value). If so, the thread priority of the selected thread is returned to its original priority at block 222. At block 224, the processing device again determines whether each of the available threads has met the forward-progress metric by being cumulatively executed for the minimum cumulative execution time for the era by as described above with respect to block 212. If all available threads have executed for the minimum cumulative execution time (e.g., all of the thread execution timers of the available threads have expired), forward progress on every available thread has been considered to have been made and the method 200 returns to block 202 for the next era. Otherwise, if one or more of the unfulfilled threads have not cumulatively executed for the minimum cumulative execution time (e.g., one or more of the thread execution timers has not expired), the method 200 returns to block 216, whereby another unfulfilled thread is selected and executed in accordance with the processes represented by blocks 216, 218, 220, 222, and 224.

In the example of FIG. 2 described above, forward progress of a thread during an era is measured by the cumulative execution time of the thread as measured by a thread execution timer. However, the method of FIG. 2 can instead be implemented for other forward-progress indicators. To illustrate, if fetches for a thread are used as forward-progress indicators, a fetch counter can be adjusted for each fetch performed during execution of the thread, and the value of the fetch counter can be compared to a predetermined value to determine whether a minimum number of fetches have occurred for the thread during the era as the forward-progress metric.

FIG. 3 illustrates a processing device 300 configured to implement an era-based thread selection technique in accordance with at least one embodiment of the present disclosure. In the depicted example, the processing device 300 includes an instruction cache 302, an instruction pipeline 304, and a thread controller 306. The instruction cache 302 is configured to store instructions for processing by the instruction pipeline 304. The instruction pipeline 304 includes a fetch module 308 configured to fetch instructions from the instruction cache and an execution unit 310 configured to execute the fetched instructions. The thread selection module 306 is configured to control the operation of the instruction pipeline 304 so as to fetch and execute instructions associated with threads in an order and for a duration determined by the thread controller 306 based on an era-based thread selection process.

In one embodiment, the thread controller 306 includes a thread scheduler 312, a thread priority storage component 314, a thread availability storage component 316, a regulation period (RP) timer 318, an instruction counter 319, and one or more thread forward-progress counter components associated with a plurality of threads, such as threads A, B, C, and D. The thread forward-progress counter components are used to measure the uses or allocation of a resource of the processing device during execution of the corresponding thread. The thread forward-progress counter component includes a counter value that is adjusted for each use or allocation of the resource during execution of the corresponding thread. To illustrate, in the context of time as a forward-progress indicator in the example of FIG. 3, the thread forward-progress counter components can be implemented as thread execution timers 320, 322, 324, and 326 associated with threads A, B, C, and D, respectively, whereby the counter values of the thread execution timers 320, 322, 324, and 326 is adjusted (e.g., decremented) for each occurrence of a clock cycle during execution of the corresponding thread.

The thread priority storage component 314 stores information representing the thread priority configuration of the threads being executed by the processing device 300. The thread availability storage component 316 stores information representing the availability of the threads for execution. The thread priority storage component 314 and the thread availability storage component 316 can be implemented as, for example, register files, a component of a cache or other memory device, and the like.

In operation, the thread scheduler 312 selects threads for execution based on thread priority configuration obtained from the thread priority storage component 314 and thread availability information obtained from the thread availability storage component 316, whereby those threads with higher priority and are available for execution typically are selected before those threads with a lower priority, while still attempting to ensure that each thread is at least minimally executed so as to achieve forward progress for all available threads.

In one embodiment, the thread controller 306 implements an era-based thread selection technique. At the start of each era of a sequence of eras, the RP timer 318 is reset to a predefined value representative of a predetermined regulation period and then begins decrementing based on an input clock signal 330, where the clock signal 330 can include, or be based on, the system clock (not shown) of the processing device 300. When the RP timer 318 expires, an end-of-regulation indicator 332 (e.g., an interrupt) is asserted, in response to which the thread scheduler returns the thread priorities of the threads to their normal thread priority configuration, as well as resetting the availability of certain threads that were set as unavailable during the regulation period. Further, the thread controller 306 can implement the instruction counter 319 to ensure that each thread has a minimum number of instructions executed before the thread can be switched out for another thread.

In the illustrated example, the thread execution timers 320, 322, 324, and 326 are implemented as separate thread execution timers for each thread that is set to a predetermined value representative of the minimum cumulative execution time at the start of an era, and then is decremented based on the clock signal 330 while the corresponding thread is being processed by the instruction pipeline 304. Accordingly, in one embodiment, a multiplexer 334 is used to route the clock signal 330 to the thread execution timer associated with the thread currently being processed by the instruction pipeline 304, where the select input of the multiplexer 334 can be configured by the thread scheduler 312 based on the thread which it has selected for processing by the instruction pipeline 304. In another embodiment, the thread execution timer components can be implemented as a single thread execution timer that is shared among all of the threads and a plurality of storage locations to store current timer values for each thread when the thread is not being executed.

In the event that the RP timer 318 reaches a predetermined value, thereby indicating the end of the regulation period for the current era, the thread scheduler 312 accesses the timer value for each available thread to verify whether each available thread has executed for at least the minimum cumulative execution time during the era. In the event that the timer values indicate that one or more of the available threads have not met this forward-progress metric, the thread scheduler 312 is configured to adjust the priority of the unfulfilled threads to a higher priority until an unfulfilled thread has been determined to meet the metric, at which point the thread priority of the thread can be returned to its original priority. Once all of the available threads have been determined to meet this metric, the thread scheduler 312 resets the thread execution timers and the RP timer 318 in preparation for the next era. Otherwise, if the timer values indicate that all of the available threads have met this forward-progress metric when the RP timer 318 reaches the predetermined value (i.e., during the regulation period), the RP timer 318 is reset for the next era.

In the example of FIG. 3, clock cycles (time) are used for measuring forward progress of the threads. However, other forward-progress indicators and metrics may be used in accordance with the scope of the present disclosure. For example, rather than using the thread execution timer components 320, 322, 324, and 326 to measure forward progress in terms of clock cycles, other implementations of a thread forward-progress counter component can be used to measure forward progress. To illustrate, for fetches as a forward-progress indicator, the thread forward-progress counter components for the threads can be implemented as a fetch counter that is adjusted (e.g., decremented) for each occurrence of a fetch during execution of the corresponding thread as signaled by the fetch module. Alternately, occurrences of other resource uses or allocations for a thread can be used to adjust a corresponding thread forward-progress counter component for measuring forward progress of the thread during an era.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
selectively executing, during a first period having a predetermined duration, a plurality of threads at a processing device based on a first thread priority configuration; and
in response to determining that each thread of a first subset of threads of the plurality of threads has not met a forward-progress metric during the first period:
modifying the first thread priority configuration by increasing a priority of each thread of the first subset of threads to generate a second thread priority configuration; and
selectively executing, during a second period subsequent to and immediately following the first period, each thread of the first subset of threads at the processing device based on the second thread priority configuration until each thread of the first subset of threads has met the forward-progress metric collectively over the first period and the second period.

2. The method of claim 1, further comprising:
for each thread of the first subset of threads, decreasing a thread priority of the thread in response to determining the thread has met the forward-progress metric during the second period.

3. The method of claim 2, further comprising:
selectively executing, during a third period subsequent to the second period, one or more threads from the plurality of threads based on the first thread priority configuration, the third period having the predetermined duration.

4. The method of claim 3, further comprising:
in response to determining that each thread of a second subset of threads of the plurality of threads has not met the forward-progress metric during the third period:
modifying the first thread priority configuration by increasing a priority of each thread of the second subset of threads to generate a third thread priority configuration; and
selectively executing, during a fourth period subsequent to and immediately following the third period, each thread of the second subset of threads based on the third thread priority configuration until each thread of the second subset of threads has met the forward-progress metric-collectively over the third period and the fourth period.

5. The method of claim 1, further comprising:
in response to determining that each thread of the first subset of threads has met the forward-progress metric during the first period, selectively executing, during a third period having the predetermined duration, one or more threads from a plurality of threads based on the first thread priority configuration.

6. The method of claim 5, further comprising:
in response to determining that each thread of a second subset of threads of the plurality of threads has not met the forward-progress metric during the third period:
modifying the first thread priority configuration by increasing a priority of each thread of the second subset of threads to generate a third thread priority configuration; and
selectively executing, during a fourth period subsequent to and immediately following the third period, each thread of the second subset of threads based on the third thread priority configuration until each thread of the second subset of threads has met the forward-progress metric collectively over the third period and the fourth period.

7. The method of claim 1, wherein:
the forward-progress metric comprises a cumulative execution for at least a predetermined time; and
the method further comprises:
for each thread of the plurality of threads, adjusting a counter value associated with the thread for each cycle of a clock signal during execution of the thread at the processing device; and
comparing, for each thread of the plurality of threads, the counter value associated with the thread with a predetermined value to determine whether the thread has met the forward-progress metric.

8. The method of claim 1, wherein:
the forward-progress metric comprises a minimum number of uses of a resource of the processing device during execution of the thread, the uses of the resource selected from a group consisting of: a fetch; a branch; a memory transaction, a use of an execution unit; a use of a completion buffer; and a use of a dispatch buffer; and
the method further comprises:
for each thread of the plurality of threads, adjusting a counter value associated with the thread for each resource use of the thread during execution of the thread at the processing device; and
comparing, for each thread of the plurality of threads, the counter value associated with the thread with a predetermined value to determine whether the thread has met the forward-progress metric.

9. The method of claim 1, wherein:
modifying the first thread priority configuration comprises setting each thread of the first subset of threads to a predetermined priority higher than the highest priority of the plurality of threads in the first thread priority configuration.

10. The method of claim 9, wherein the predetermined priority is not settable via software.

11. The method of claim 1, further comprising:
disabling a thread of the first subset of threads from further execution during the second period when the thread has met the forward-progress metric during the first period and the second period.

12. A method comprising:
initializing a first timer at a processing device;
selectively executing a plurality of threads at the processing device based on normal priorities associated with the plurality of threads until the first timer expires, wherein an execution counter value associated with a corresponding thread is adjusted proportional to an occurrence of a forward-progress indicator during execution of the thread;
in response to determining each execution counter value associated with the plurality of threads is at a predetermined value when the first timer expires: reinitializing the first timer and selectively executing one or more threads of the plurality of threads based on the normal priorities until the first timer expires; and
in response to determining each execution counter value associated with a subset of the plurality of threads is not at the predetermined value when the first timer expires: disabling execution of each thread of the plurality of threads not included in the subset of the plurality of threads; and
selectively executing each thread of the subset of the plurality of threads based on a modified priority order associated with the subset of the plurality of threads until each execution counter value associated with a corresponding thread of the subset of the plurality of threads is at the predetermined value, wherein the execution counter value associated with the corresponding thread is adjusted proportional to an occurrence of a forward-progress indicator during execution of the corresponding thread.

13. The method of claim 12, further comprising:
enabling execution of each thread of the plurality of threads not included in the subset of the plurality of threads in response to determining that each execution counter value associated with a corresponding thread of the subset of the plurality of threads is at the predetermined value;
reinitializing the first timer; and
selectively executing one or more threads of a plurality of threads based on normal priorities associated with the plurality of threads until the first timer expires, wherein the execution counter value associated with a corresponding thread is adjusted proportional to an occurrence of the forward-progress indicator during execution of the thread.

14. The method of claim 12, wherein the forward-progress indicator comprises one selected from a group consisting of: a clock cycle of a clock signal; a fetch; a branch; a memory transaction; a use of an execution unit; a use of a completion buffer; and a use of a dispatch buffer.

15. A processing device comprising:
   a storage component configured to store instructions, each instruction associated with a corresponding thread of a plurality of threads;
   an execution unit configured to fetch instructions from the storage component and execute the fetched instructions;
   a period timer comprising an input to receive a clock signal and an output to provide an indicator in response to a count value of the period timer reaching a first predetermined value based on the clock signal;
   a plurality of thread forward-progress counter components, each thread forward-progress counter component associated with a corresponding thread of the plurality of threads and configured to adjust a corresponding execution counter value based on an occurrence of a forward-progress indicator while instructions of the corresponding thread are being executed by the execution unit; and
   a thread select module configured to:
      select threads of the plurality of threads for execution by the execution unit based on a state of the period timer, a state of each of the plurality of thread forward-progress counter components, and a first priority configuration corresponding to each thread of the plurality of threads;
      determine that each thread forward-progress counter associated with a subset of the plurality of threads is not at a second predetermined value when the period timer reaches the first predetermined value;
      disable execution of each thread of the plurality of threads not included in the subset of the plurality of threads; and
      select each thread of the subset of the plurality of threads for execution by the execution unit and executing until each thread forward-progress counter associated with the subset of the plurality of threads is at the second predetermined value based on a second priority configuration corresponding to each thread of the subset of the plurality of threads.

16. The processing device of claim 15, wherein the thread select module is configured to:
   select threads of the plurality of threads for execution based on the first thread priority configuration while the period timer is not asserted.

17. The processing device of claim 16, wherein a priority of each thread of the subset of threads in the second thread priority configuration is higher than a priority of the thread in the first thread priority configuration.

18. The processing device of claim 15, wherein the thread select module is configured to:
   determine each execution counter value associated with a corresponding thread of the subset of threads is equal to the second predetermined value in response to selectively executing threads of the subset of threads; and
   reinitialize the period timer and the plurality of thread forward-progress counter components.

19. The processing device of claim 15, wherein:
   the forward-progress indicator comprises a cycle of a clock signal; and
   each of the plurality of thread execution timers comprises:
      a timer having an input to receive the clock signal, an enable input asserted when the corresponding thread is being executed by the execution unit, and an output to provide an execution counter value based on the enable input and the clock signal.

20. The processing device of claim 15, wherein the forward-progress indicator comprises at least one selected from a group consisting of: a branch; a fetch; a memory transaction; a use of the execution unit; a use of a completion buffer; and a use of a dispatch buffer.

* * * * *